United States Patent [19]

Etheridge

[11] Patent Number: 4,787,642
[45] Date of Patent: Nov. 29, 1988

[54] X-SHAPED HIGH PRESSURE SEALING STRUCTURE

[75] Inventor: Reggie H. Etheridge, Houston, Tex.

[73] Assignee: Seaboard Wellhead, Inc., Houston, Tex.

[21] Appl. No.: 42,849

[22] Filed: Apr. 27, 1987

[51] Int. Cl.$^4$ .............................................. F16J 15/24
[52] U.S. Cl. .......................... 277/206 A; 277/212 C; 277/236
[58] Field of Search ............... 277/205, 206 R, 206 A, 277/212 R, 212 C, 236

[56] References Cited

U.S. PATENT DOCUMENTS

| | | | |
|---|---|---|---|
| 2,841,429 | 7/1958 | McCuistion | 277/206 A X |
| 3,047,300 | 7/1962 | Taylor et al. | 277/205 X |
| 3,047,301 | 7/1962 | Taylor et al. | 277/206 A X |
| 3,098,660 | 7/1963 | Hausner | 277/206 A X |

Primary Examiner—Robert S. Ward
Attorney, Agent, or Firm—Guy E. Matthews

[57] ABSTRACT

A high pressure seal structure to seal against fluid pressure around a cylinder member movably. The structure includes an integral circular metal sealing ring including a pair of first circular sealing lips having a cross-section of chevron shape axially opening in a first direction to flexibly extend with a first inner lip in sealing relation against the cylindrical surface of the cylinder member and with the first outer lip in sealing relation against a cylindrical wall formed in the housing. Also included is a pair of second circular sealing lips having a cross-section of chevron shape axially opening in a second direction to flexibly extend with a second inner lip in sealing relation against the cylindrical surface and with a second outer lip in sealing relation against the cylindrical wall. A deformable inner sealing ring having a triangular cross-section is closely fitted in the space defined by the first inner lip, the second inner lip, and the cylindrical surface. A deformable outer sealing ring having a triangular cross-section is closely fitted in the space defined by the first outer lip, the second outer lip, and the cylindrical wall. A first circular and moveable and metal engagement ring having a cross-section of chevron shape axially extends into the opening form by the first sealing lips to expand the first sealing lips. A second circular and moveable metal engagement ring having a cross-section of chevron shape axially extends the opening formed by the second sealing lips to expand the second sealing lips. An axially moveable circular adjustment structure is provided to urge the first engagement ring and the second ring together for expanding the first sealing lips and the second sealing lips.

31 Claims, 2 Drawing Sheets

X-SHAPED HIGH PRESSURE SEALING STRUCTURE

FIELD OF THE INVENTION

This invention generally relates to cylindrical seal or packing structures and more particularly pertains to a pressure energized and self energized seal structure for sealing against very high fluid pressures.

BACKGROUND OF THE INVENTION

Sealing structures of many kinds are presently commercially available. Some are elastomeric, some are mechanical, and some, as with the present invention, may be a combination of mechanical and organic materials. In very high temperature embodiments, the embodiment herein disclosed may be provided without elastomeric components with successful application. The presently known most pertinent prior art U.S. Pat. Nos. are 1,721,325; 2,392,182; 3,098,660; 3,215,441; and 3,314,683.

OBJECTS OF THE INVENTION

One object of the present invention is to provide a reuseable high pressure sealing structure which may be initially self energized and thereafter further energized by fluid pressure.

Another object of the present invention is to provide a high pressure seal which may be used with elastomeric components in some applications and used with metals only components in other applications.

Still another object of the present invention is to provide a metal to metal seal in a high pressure sealing structure wherein one of the metal components is provided of materials sufficiently deformable to establish a fluid tight seal without the lapped sealing surfaces sometimes required in high pressure installations.

SUMMARY OF THE INVENTION

The foregoing and other objects of the present invention are attained in a high pressure seal structure adapted for mounting within a housing to seal against fluid pressure around a cylinder member movably disposed in an opening formed by the housing. The structure includes an integral circular metal sealing ring including a pair of first circular sealing lips having a cross-section of chevron shape axially opening in a first direction to flexibly extend with a first inner lip in sealing relation against the cylindrical surface of the cylinder member and with the first outer lip in sealing relation against a cylindrical wall formed in the housing. Also included is a pair of second circular sealing lips having a cross-section of chevron shape axially opening in a second direction to flexibly extend with a second inner lip in sealing relation against the cylindrical surface and with a second outer lip in sealing relation against the cylindrical wall. A deformable inner sealing ring having a triangular cross-section is closely fitted in the space defined by the first inner lip, the second inner lip, and the cylindrical surface. A deformable outer sealing ring having a triangular cross-section is closely fitted in the space defined by the first outer lip, the second outer lip, and the cylindrical wall. A first circular and movable and metal engagement ring having a cross-section of chevron shape axially extends into the opening form by the first sealing lips to expand the first sealing lips. A second circular and moveable metal engagement ring having a cross-section of chevron shape axially extends into the opening formed by the second sealing lips to expand the second sealing lips. An axially moveable circular adjustment structure is provided to urge the first engagement ring and the second ring together for expanding the first sealing lips and the second sealing lips. Deformable sealing rings are interposed at the juncture of the inner lips, the outer lips, and the engagement rings for establishing initial low pressure sealing. The seal structure may be provided alternately without the deformable inner sealing ring or the deformable outer sealing ring. The seal structure may also be provided with an integral circular metal sealing ring having only the pair of first circular sealing lips and the first moveable metal engagement ring as above described. The seal structure may further be provided without the deformable sealing rings as above described. The cylindrical surface of the cylindrical body may be formed with a hard smooth chrome plated surface suitable for dynamic seating. The cylindrical wall of the housing may be formed with a surface finish suitable for static sealing.

DESCRIPTION OF A PREFERRED EMBODIMENT

Figure 1:
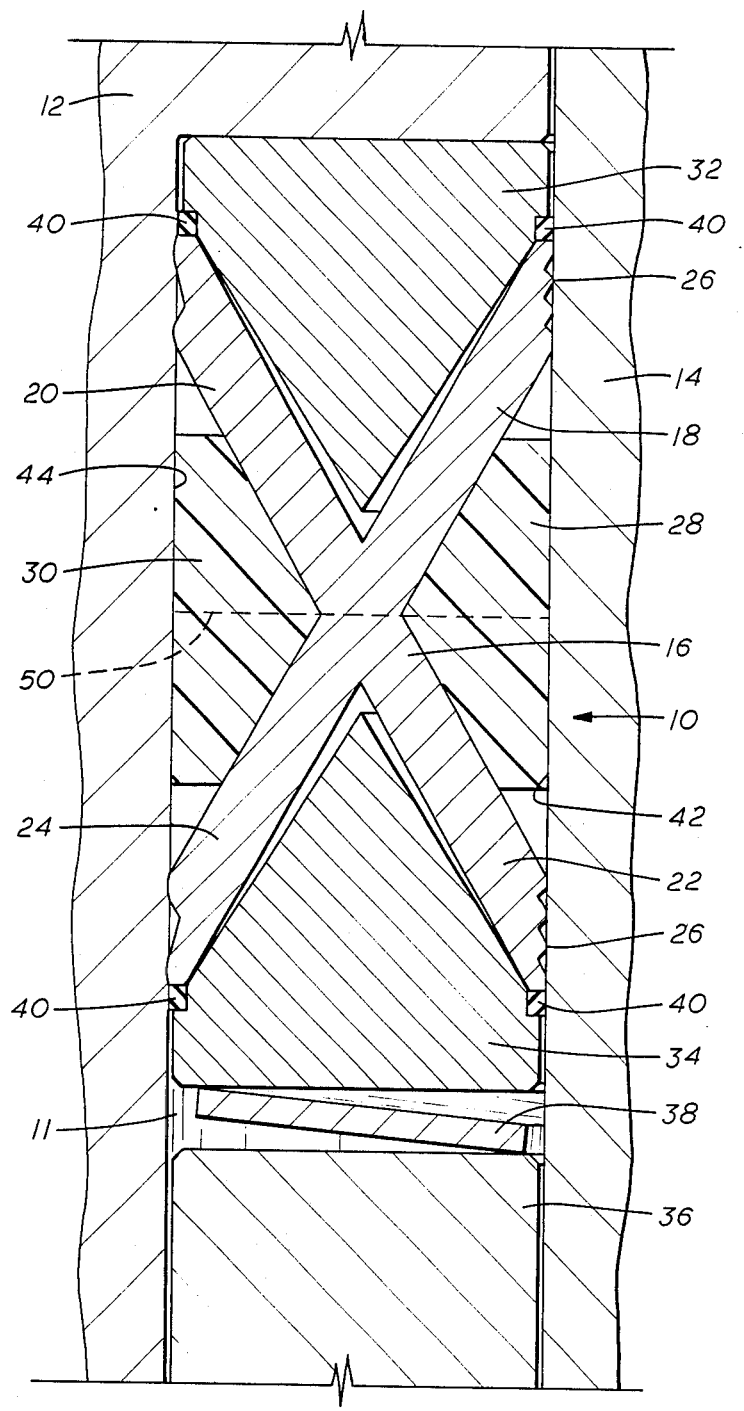
FIG. 1 is a generally schematic longitudinal cross-section of the seal structure of the present invention with the dashed line indicating an alternate embodiment.

The seal structure 10 of the present invention is best illustrated in FIG. 1. The seal structure 10, which is shown in longitudinal cross-section in FIG. 1, is cylindrical in shape and is mounted around a cylindrical member 14, such as a shaft or pipe. The cylindrical member 14 is provided with a sealing surface 42 which is desirably very smooth and very hard such as chromium plate. The seal structure 10 is mounted within a cylindrical recess 11 formed by a housing 12.

The seal structure 10 is comprised of several coordinating components with the major component being a circular sealing ring 16 which, as shown, is "X" shaped in cross-section as in integral unit. More particularly, the sealing ring 16 may be considered as a first pair of circular sealing lips 18 and 20 having a cross-section of chevron or "V" shape axially opening in a first direction and a second pair of circular sealing lips 22 and 24 also having a cross-section of chevron or "V" shape axially opening in a second direction. The first sealing lip 18 flexibly extends in sealing relation against the cylindrical surface 42 of the cylinder member 14 and the first outer lip 20 extends in sealing relation against the cylindrical seal surface 44 which forms the recess 11. The second inner lip 22 likewise flexibly extends against the seal surface 42 of the cylindrical member 14 and the second outer lip 24 flexibility extends into sealing relation against the cylindrical seal surface 44 forming the recess 11.

The sealing ring 16 may be provided of metal with hardness of $R_c$ 22, for example, with the metal being 300 stainless steel. The inner lips 18 and 22 of the sealing ring 16 may be variously formed (such as corrugations 26) which present multiple sealing surfaces against the hard sealing surface 42. The outer lips 0 and 24 may be circumferentially notched as shown in the drawing, or alternately present plain cylindrical surfaces for sealing engagement with the seal surface 44 as shown.

The seal surface 44 may also be slightly corrugated, such as with a machine tool, or of just a surface finish to permit some slight conformation from high point loading by the lips 20 and 24 (shown exaggerated in FIG. 1).

A circular sealing ring 32 is circular in shape and provided of cross-section of chevron shape which axially extends into the opening formed by the first sealing lips 18 and 20 to expand these sealing lips in response to axial force. A second metal engagement ring 34, as shown, is circular in shape and of chevron shape in cross-section to extend into the opening formed by the second sealing lips 22 and 24.

A deformable inner sealing ring 28 is shown to be triangular in cross-section and circular in shape to conform to the space defined by the first inner lip 18, the second inner lip 22, and the cylindrical surface 42. This sealing ring 28 is closely fitted into the space as defined and thereby establishes an initial seal against flow of fluids past the sealing ring 16 and the cylindrical member 14.

A deformable outer sealing ring 30 of triangular cross section and circular shape is provided to fit in the space defined by the first outer lip 20, the second outer lip 24, and the seal surface 44 as shown. As with sealing ring 28, the sealing ring 30 is closely fitted within the space defined to initially establish a seal against flow of fluids between the seal ring 16 and the seal surface 44 of housing 12. The sealing rings 28 and 30 may be provided of Neoprene rubber, plastic, or the like.

To further provide initial seals against fluid flow, seal rings 40 (a total of four) are provided at the junctures of seal surface 44, engagement ring 32, first outer lip 20, first inner lip 18, and seal surface 42 on the first end to establish a seal. Likewise the junctures of the seal surface 44, second outer lip 24, engagement ring 34, seal surface 44, and outer lip 22 also have provided the seal rings 40 as shown.

The seal rings 40 may be provided of Neoprene rubber, plastic or a relatively soft metal as later mentioned.

When desirable, any or all of the sealing rings 28, 30, and 40 may be provided of a hardened deformable lubricant material.

An axially moveable circular adjustment structure is illustrated as an adjustment ring 36 adjustable to exert a compressive force against a Bellville spring 38 which in turn is forcefully engaged against the engagement ring 34 to force engagement ring 34 into the "V" formed by the outer lip 24 and inner lip 22, thereby compressing the same against the seal surface 42 and the static seal surface 44.

The sealing ring 16 is relatively moveable and transmits the force from engagement ring 34 through the sealing ring 16 to the engagement ring 32 which then behaves the same as the engagement ring 34 to expand the lips 18 and 20 respectively against the surfaces 42 and 44.

Though illustrated as only one spring, the Bellville spring 38 may be a stack of a plurality of such springs. The adjustment ring 36 may be moved forcefully against the spring 38 by means of threaded connection with the housing 12 (not shown) or other equivalent structure.

It is to be noted that the adjustment ring 36 can bear directly against the engagement ring 34 if the application of the seal structure 10 is such that residual movement of the engagement ring 34 is not considered to be necessary.

As later mentioned, the dashed line 50, as shown in FIG. 1, denotes a situation where either the sealing lips 18 and 20 with ring 32, or the sealing lips 22 and 24 with ring 34, may be utilized separately from the other to provide a high pressure fluid seal with the axial opening of the sealing lips facing into the high pressure side of the seal.

Figure 2:
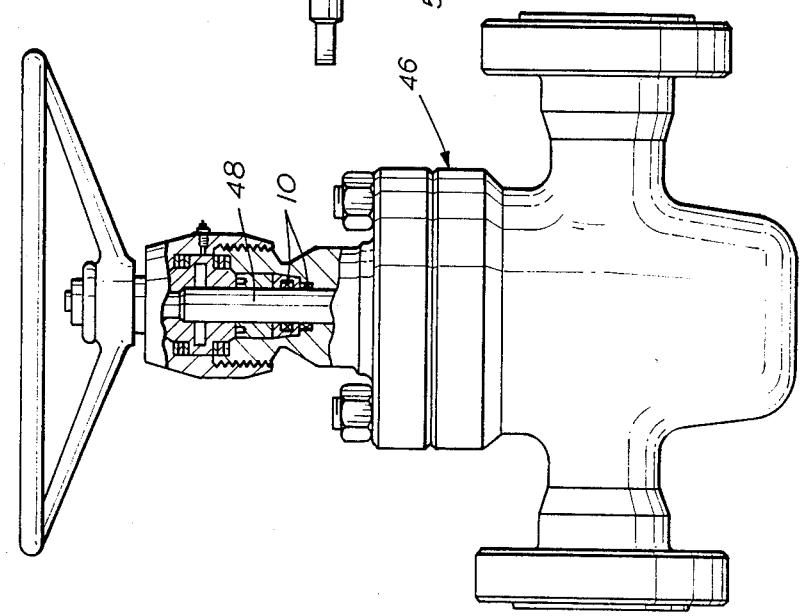
FIG. 2 is a partial cross-sectional view of the stem section of a valve where the seal structure of the present invention is used.

FIG. 2 illustrates a line valve 46 having a valve stem 48 where the fluid pressure occurring within the valve is sealed from fluid flow passing by the stem 48 by two of the valve structures 10 as illustrated. The fluid pressure within the valve 46 might be in the range of 10,000 PSI, for example.

Figure 3:
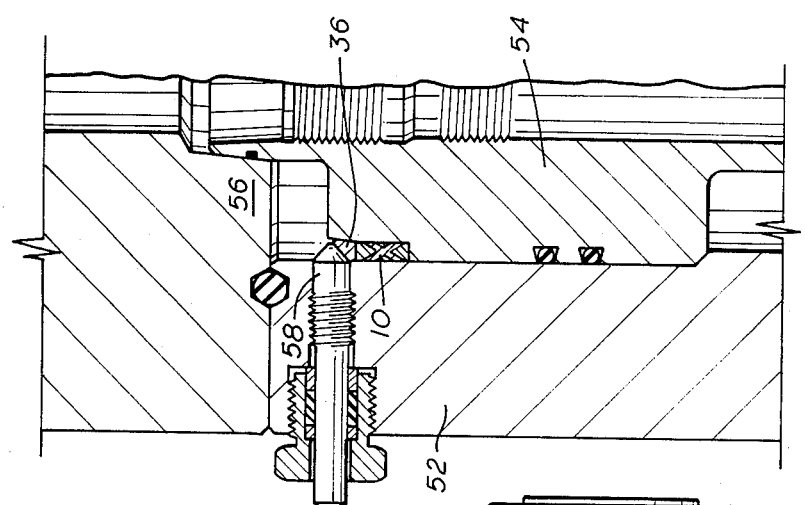
FIG. 3 is an oil well tubing hanger assembly which employs the seal structure of the present invention.

FIG. 3 illustrates for example, an oil well tubing head 52 and which is mounted a tubing hanger 54 and a production head 56. An embodiment of the seal structure 10 is utilized wherein the adjustment ring 36 is modified to be adjusted by a plurality of support bolts 58. The fluid pressures in this kind of installation may be from 5,000 to 15,000 PSI, for example.

Figure 4:
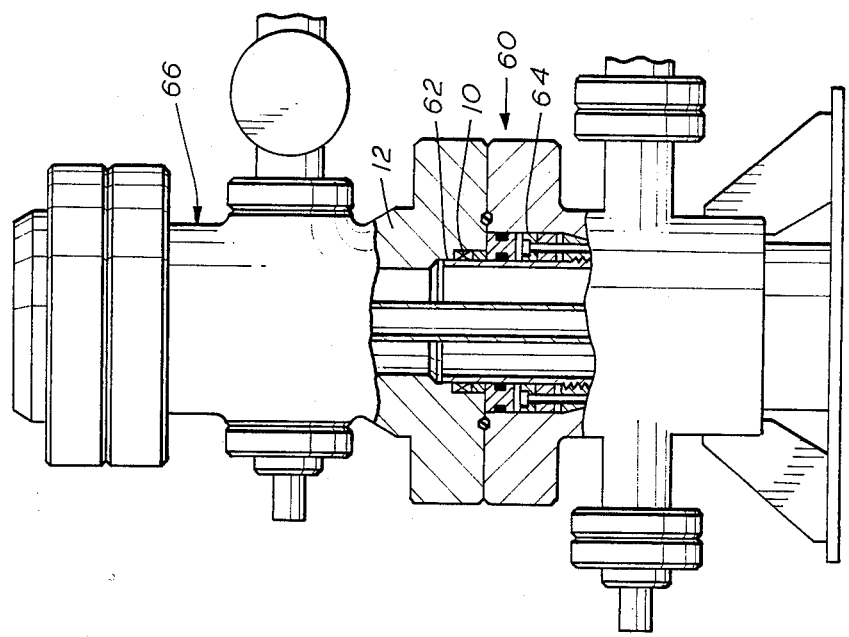
FIG. 4 is a longitudinal partially sectional view showing a well casing hanger assembly and attached control valve where the seal structure of the present invention is used to seal the well casing as extends up through the hanger assembly.

FIG. 4 illustrates an exemplary well-head 60 wherein a well casing 62 extends upwardly through a casing hanger assembly 64 to be vertically supported by the hanger assembly 64. As shown, the casing 62 extends into the housing 12 of a control valve 66. An embodiment of the seal structure 10 is installed about the cylindrical casing 62 and within the housing 12 for use as illustrated in FIG. 1. The high pressure side of this installation is from within the casing 62 outwardly toward the casing hanger assembly 64.

As previously mentioned, the integral seal ring 16, as shown in FIG. 1, is a composite of the first sealing lips 18 and 20 and the second sealing lips 22 and 24 to form the "X" configuration as shown. This is considered to be the preferred embodiment of the seal structure 10 for most sealing installations where seal structure 10 is used. However, a modification of the seal 10 such as divided at dashed line 50 to incorporate only the seal lips 22 and 24 and half of the deformable sealing rings 28 and 30 can prove to be adequate and useful in installations where axial length of the seal is critical and where high pressure against the seal always impinges from the axially opening end of the lips 22 and 24.

There will be installations of the seal structure 10 in very high temperature environments where the deformable seal rings 28 and 30 would deteriorate immediately after installation. In these high temperature installations the seal rings 28 and SO are either not installed at all, or are expected to be ineffectual once their upper temperature limit has been exceeded. In such high temperature installations, the seal rings 40, as shown, also may be deleted during installation or be provided of some relatively soft and, malleable material such as annealed low carbon steel or malleable iron, for example.

To give perspective to the relative sizes in which the seal structure 10 may be provided, exemplary distances between the sealing surface 42 and the sealing surface 44 may range from 3/16 inch to 1 inch, for example.

It is to be noted that the embodiment herein disclosed is illustrative only, and that modifications and changes may be made without departing from the spirit of the invention and the purview of the appended claims.

What is claimed is:

1. In a high pressure seal structure adapted for mounting within a housing to seal against fluid pressure around a cylinder member disposed within an opening formed by said housing, the combination of:
   (1) an integral circular metal sealing ring comprising:
      (a) a pair of first circular sealing lips having a cross section of chevron shape axially opening in a first direction to flexibly extend with a first inner lip in sealing relation against the cylindrical surface of said cylinder member and with a first outer lip in sealing relation against a cylindrical wall formed in said housing;
      (b) a pair of second circular sealing lips having a cross section of chevron shape axially opening in a second direction to flexibly extend with a second inner lip in sealing relation against said cylindrical surface and with a second outer lip in sealing relation against said cylindrical wall;
   (2) a deformable inner sealing ring having a triangular cross-section closely fitted in the space defined by said first inner lip, said second inner lip, and said cylindrical surface;
   (3) a deformable outer sealing ring having a triangular cross-section closely fitted in the space defined by said first outer lip, said second outer lip, and said cylindrical wall;
   (4) a first circular and movable metal engagement ring having a cross-section of chevron shape axially extending into the opening formed by said first sealing lips to expand said first sealing lips;
   (5) a second circular and moveable metal engagement ring having a cross-section of chevron shape axially extending into the opening formed by said second sealing lips to expand said second sealing lips;
   (6) axially moveable circular adjustment means urging said first engagement ring and said second engagement ring together for expanding said first and sealing lips and said second sealing lips; and
   (7) deformable juncture sealing rings interposed at the juncture of said inner lips, said outer lips, and said engagement rings for establishing initial low pressure sealing.

2. The combination of claim 1 wherein said cylindrical surface of said cylindrical body is formed with a hard smooth chrome plated surface suitable for dynamic sealing.

3. The combination of claim 1 wherein said cylindrical wall of said housing is formed with a surface finish suitable for static sealing.

4. The combination of claim 1 wherein said metal sealing ring is formed of a relatively deformable metal.

5. The combination of claim 1 wherein said inner and said outer deformable sealing rings are formed of a plastic material.

6. The combination of claim 1 wherein said juncture sealing rings are formed of a deformable material.

7. The combination of claim 1 wherein said first and said second inner lips are formed with corrugated faces in engagement with said cylindrical surface.

8. The combination of claim 1 wherein said circular adjustment means includes a Bellville spring.

9. The combination of claim 1 wherein (1) said metal sealing ring is formed of a relatively deformable metal; (2) said inner and said outer deformable sailing rings are formed of a hardened lubricant material; (3) said juncture sealing rings are formed of a deformable lubricant material; (4) said first and said second inner lips are formed with corrugated faces in engagement with said cylindrical surface and; (5) said circular adjustment means includes a Bellville spring.

10. In a high pressure seal structure adapted for mounting within a housing to seal against fluid pressure and around a cylinder member disposed within an opening formed by said housing, the combination of:
   (1) an integral circular metal sealing ring comprising of a pair of circular sealing lips having a cross section of chevron shape axially opening in a first direction to flexibly extend with an inner lip in sealing relation against the cylindrical surface of said cylinder member and with an outer lip in sealing relation against a cylindrical wall formed in said housing;
   (2) a deformable inner sealing ring having a triangular cross-section closely fitted in a space defined by said inner lip, said housing and said cylindrical surface;
   (3) a deformable outer sealing ring having a triangular cross-section closely fitted in a space defined by said outer lip, said housing and said cylindrical surface;
   (4) a circular and movable metal engagement ring having a cross-section of chevron shape axially extending into the opening formed by said sealing lips to expand said sealing lips; and
   (5) axially moveable circular adjustment means urging said engagement ring for expanding said first sealing lips and said second sealing lips;

11. The combination of claim 10 wherein said cylindrical surface of said cylindrical body is formed with a hard smooth chrome plated surface suitable for dynamic sealing.

12. The combination of claim 10 wherein said cylindrical wall of said housing is formed with a surface finish suitable for static sealing.

13. The combination of claim 10 wherein said metal sealing ring is formed of a relatively deformable metal.

14. The combination of claim 10 wherein said inner and said outer deformable sealing rings are formed of a deformable 15. The combination of claim 10 wherein said inner lip is formed as a corrugated face in engagement with said cylindrical 16. The combination of claim 10 wherein said circular adjustment means includes a Bellville spring.

17. The combination of claim 10 wherein (1) said metal sealing ring is formed of a relatively, deformable metal; (2) said inner and said outer deformable sealing rings are formed of a plastic material; (3) said inner lip is formed as a corrugated face in engagement with said cylindrical surface; and (4) said circular adjustment means includes a Bellville spring.

18. In a high pressure seal structure adapted for mounting within a housing to seal against fluid pressure around a cylinder member disposed within an opening formed by said housing, the combination of:
   (1) an integral circular metal sealing ring comprising:

(a) a pair of first circular sealing lips having a cross section of chevron shape axially opening in a first direction to flexibly extend with a first inner lip in sealing relation against the cylindrical surface of said cylinder member and with a first outer lip in sealing relation against a cylindrical wall formed in said housing;

(b) a pair of second of circular sealing lips having a cross section of chevron shape axially opening in a second direction to flexibly extend with a second inner lip in sealing relation against said cylindrical surface and with a second outer lip in sealing relation against said cylindrical wall;

(2) a first circular and movable metal engagement ring having a cross-section of chevron shape axially extending into the opening formed by said first sealing lips to expand said first sealing lips;

(3) a second circular and moveable metal engagement ring having a cross-section of chevron shape axially extending into the opening formed by said second sealing lips to expand said second sealing lips; and (4) axially moveable circular adjustment means urging said first engagement ring and said second engagement ring together for expanding said first sealing lips and second lips.

19. The combination of claim 18 wherein said cylindrical surface of said cylindrical body is formed with a hard smooth chrome plated surface suitable for dynamic sealing.

20. The combination of claim 18 wherein said cylindrical wall of said housing is formed with a surface finish suitable for static sealing.

21. The combination of claim 18 wherein said metal sealing ring is formed of a relatively deformable metal.

22. The combination of claim 18 wherein said first and said second inner lips are formed as corrugated faces in engagement with said cylindrical surface.

23. The combination of claim 18 wherein said circular adjustment means includes a Bellville spring.

24. The combination of claim 18 wherein (1) said cylindrical surface of said cylindrical body is formed with a hard smooth chrome plated surface suitable for dynamic sealing; (2) said cylindrical wall of said housing is formed with a surface finish suitable for static sealing; (3) said metal sealing ring is formed of a relatively deformable metal; (4) said first and said second inner lips are formed as corrugated faces in engagement with state cylindrical surface; and (5) said circular adjustment means includes a Bellville spring.

25. In a high pressure seal structure adapted for mounting within a housing to seal against fluid pressure around a cylinder member disposed within an opening formed by said housing, the combination of:

(1) an integral circular metal sealing ring comprising:
   (a) a pair of circular sealing lips having a cross section of chevron shape axially opening in a first direction to flexibly extend with an inner lip in sealing relation against the cylindrical surface of said cylinder member and with an outer lip in sealing relation against a cylindrical wall formed in said housing;

(2) a circular and movable metal engagement ring having a cross-section of chevron shape axially extending into the opening formed by said sealing lips to expand said sealing lips; and (6) axially moveable circular adjustment means urging said engagement ring for expanding said first sealing lips and second lips.

26. The combination of claim 25 wherein said cylindrical surface of said cylindrical body is formed with a hard smooth chrome plated surface suitable for dynamic sealing.

27. The combination of claim 25 wherein said cylindrical wall of said housing is formed with a surface finish suitable for static sealing.

28. The combination of claim 25 wherein said metal sealing ring is formed of a relatively deformable metal.

29. The combination of claim 25 wherein inner lip is formed as a corrugated face in engagement with said cylindrical surface.

30. The combination of claim 25 wherein said circular adjustment means includes a Bellville spring.

31. In a high pressure seal structure adapted for mounting within a housing to seal against fluid pressure around a cylinder member disposed within an opening formed by said housing, the combination of:

(1) an integral circular metal sealing ring comprising:
   (a) a pair of first circular sealing lips having a cross section of chevron shape axially opening in a first direction to flexibly extend with a first inner lip in sealing relation against the cylindrical surface of said cylinder member and with a first outer lip in sealing relation against a cylindrical wall formed in said housing;
   (b) a pair of second of circular sealing lips having a cross section of chevron shape axially opening in a second direction to flexibly extend with a second inner lip in sealing relation against said cylindrical surface and with a second outer lip in sealing relation against said cylindrical wall;

(2) a first circular and movable metal engagement ring having a cross-section of chevron shape axially extending into the opening formed by said first sealing lips to expand said first sealing lips;

(3) a second circular and moveable metal engagement ring having a cross-section of chevron shape axially extending into the opening formed by said second sealing lips to expand said second sealing lips; and (4) axially moveable circular adjustment means urging said first engagement ring and said second engagement ring together for expanding said first sealing lips and second lips;

(5) said cylindrical surface of said cylindrical body is formed with a hard smooth chrome plated surface suitable for dynamic sealing;

(6) said cylindrical wall of said housing is formed with a surface finish suitable for static sealing;

(7) said metal sealing ring is formed of a relatively deformable metal;

(8) said first and said second inner lips are formed as corrugated faces in engagement with said cylindrical surface; and (9) said circular adjustment means includes a Bellville spring.

* * * * *